(12) United States Patent
Grote

(10) Patent No.: US 9,227,457 B1
(45) Date of Patent: Jan. 5, 2016

(54) DECORATIVE KEEPSAKE AND ASSOCIATED USE THEREOF

(76) Inventor: Barbarann Grote, Simi Valley, CA (US)

( * ) Notice: Subject to any disclaimer, the term of this patent is extended or adjusted under 35 U.S.C. 154(b) by 0 days.

(21) Appl. No.: 13/478,364

(22) Filed: May 23, 2012

Related U.S. Application Data

(60) Provisional application No. 61/579,852, filed on Dec. 23, 2011.

(51) Int. Cl.
| | | |
|---|---|---|
| *B65D 85/00* | (2006.01) | |
| *B42D 15/04* | (2006.01) | |
| *G11B 33/04* | (2006.01) | |
| *B42D 15/08* | (2006.01) | |
| *B65D 27/08* | (2006.01) | |

(52) U.S. Cl.
CPC .............. *B42D 15/042* (2013.01); *B42D 15/08* (2013.01); *G11B 33/0494* (2013.01); *B65D 27/08* (2013.01); *Y10S 493/917* (2013.01)

(58) Field of Classification Search
CPC ........ A45C 1/06; A45C 11/08; B42D 15/042; B42D 15/08; G11B 33/0494; B65D 15/08; B65D 65/12; B65D 27/00; Y10S 229/922; Y10S 229/93; Y10S 493/917
USPC .......... 206/459.5, 737; 229/71, 75, 102.5, 72, 229/68.1, 87.5, 92.1
See application file for complete search history.

(56) References Cited

U.S. PATENT DOCUMENTS

| | | | | |
|---|---|---|---|---|
| 35,861 | A | * | 7/1862 | Wilson .............................. 229/71 |
| 221,864 | A | * | 11/1879 | Weigand .................... 285/285.1 |
| 442,842 | A | * | 12/1890 | West ................................ 229/75 |
| 886,350 | A | * | 5/1908 | Corliss ............................ 229/72 |
| 888,350 | A | * | 5/1908 | Corliss .......................... 273/292 |
| 4,221,251 | A | | 9/1980 | Wagner |
| 6,732,459 | B1 | | 5/2004 | Clark |
| 2006/0000127 | A1 | | 1/2006 | Schindele |

* cited by examiner

*Primary Examiner* — Anthony Stashick
*Assistant Examiner* — James M Van Buskirk

(57) ABSTRACT

A keepsake for being filled with party favors, treats, small gifts, gift cards and/or greeting cards includes a flexible sheet provided with oppositely disposed front and rear sides, oppositely disposed top and bottom edges, oppositely disposed right and left portions, a center portion intermediately disposed between the right and left portions, a bottom portion extending upwardly from the bottom edge and spanning across the right, center and left portions, respectively. A decorative item (e.g., party favor, treat, small gift, gift card and/or greeting card) is positioned proximate to the pocket such that the decorative item (e.g., party favor, treat, small gift, gift card and/or greeting card) is visible from the front side without blocking the pocket when the sheet is oriented in the tri-folded position.

3 Claims, 9 Drawing Sheets

DECORATIVE KEEPSAKE AND ASSOCIATED USE THEREOF

CROSS REFERENCE TO RELATED APPLICATIONS

This application claims the benefit of U.S. Provisional Application No. 61/579,852, filed Dec. 23, 2011, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

1. Technical Field

Exemplary embodiment(s) of the present disclosure relate to keepsakes and, more particularly, to a decorative keepsake configured to be filled with party favors, treats, small gifts, gift cards and/or greeting cards.

2. Prior Art

Every weekend, countless consumers across the country attend parties, showers and similar festive gatherings. Whether a surprise "Sweet 16" party thrown for a favorite adolescent, a bridal shower attended by a group of college friends, anniversary party which honors a couple married twenty-five years, parties and similar celebrations enable consumers to spend precious time with friends and loved ones in a fun and relaxing setting and/or even just a single card to a special person. At most parties and holiday celebrations, a festive mood is easily created through simple party decorations. While brightly colored streamers and balloons may be appropriate for a child's birthday party, soft glowing candles and beautiful floral arrangements are often the norm at elegant gatherings attended by adults. In many cases, gifts are exchanged between guests and the guest(s) of honor. Further, party hosts and hostesses themselves often offer a memento or keepsake to party guests as a means of celebrating a special day.

Accordingly, a need remains for a decorative keepsake configured to be filled with party favors, treats, small gifts, gift cards and/or greeting cards in order to overcome prior art shortcomings. The exemplary embodiment(s) satisfy such a need by providing a decorative keepsake that is convenient and easy to use, lightweight yet durable in design, versatile in its applications, and designed for being filled with party favors, treats, small gifts, gift cards and/or greeting cards.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a keepsake for being filled with party favors, treats, small gifts, gift cards and/or greeting cards. These and other objects, features, and advantages of the non-limiting exemplary embodiment(s) are provided by a keepsake including a flexible sheet provided with oppositely disposed front and rear sides, oppositely disposed top and bottom edges, oppositely disposed right and left portions, a center portion intermediately disposed between the right and left portions, a bottom portion extending upwardly from the bottom edge and spanning across the right, center and left portions, respectively. A decorative item is positioned proximate to the pocket such that the decorative item is visible from the front side without blocking the pocket when the sheet is oriented in the tri-folded position.

Advantageously, the sheet is selectively oriented in a tri-folded position when the bottom portion is folded along a first latitudinal axis towards the top edge such that the bottom edge terminates prior to reaching the top edge. Such a bottom portion is further folded along a second latitudinal axis towards the first latitudinal axis such that the bottom edge terminates prior to reaching the first latitudinal axis. The left and rights portions are folded along first and second longitudinal axes, respectively, and away from the front side such that the left and right portions 16, 17 lay anterior to the front side thereby forming a pocket at the intermediate section and the front side. In this manner, the pocket has a longitudinal length extending from the first latitudinal axis to the second latitudinal axis.

In a non-limiting exemplary embodiment, the bottom portion lays over the pocket and thereby creates a flap extending downwardly from the pocket when the sheet is at the tri-folded position.

In a non-limiting exemplary embodiment, the right and left portions overlap each other when the sheet is at the tri-folded position.

In a non-limiting exemplary embodiment, the bottom portion continuously spans across an entire latitudinal width of the left and right portions as well as the intermediate portions when the sheet is at the tri-folded position.

In a non-limiting exemplary embodiment, the pocket spans across an entire latitudinal width of the intermediate portion when the sheet is at the tri-folded position.

In a non-limiting exemplary embodiment, the rear side is entirely covered by the overlapping left and right portions when the sheet is at the tri-folded position.

In a non-limiting exemplary embodiment, the bottom portion spans across an entire latitudinal width of the sheet.

In a non-limiting exemplary embodiment, the present disclosure further includes a method of utilizing a keepsake. Such a method includes the initial step of: providing a flexible sheet including oppositely disposed front and rear sides, oppositely disposed top and bottom edges, oppositely disposed right and left portions, a center portion intermediately disposed between the right and left portions, and a bottom portion extending upwardly from the bottom edge and spanning across the right, center and left portions, respectively. Of course, the sheet may be formed from any suitable material without departing from the true scope and spirit of the present disclosure.

The method further includes the chronological steps of: orienting the flexible sheet to a tri-folded position by performing the following steps: folding the bottom portion along a first latitudinal axis towards the top edge such that the bottom edge terminates prior to reaching the top edge; folding the bottom portion along a second latitudinal axis towards the first latitudinal axis such that the bottom edge terminates prior to reaching the first latitudinal axis; forming a pocket at the intermediate section and the front side by folding the left and rights portions along first and second longitudinal axes, respectively, and away from the front side such that the left and right portions 16, 17 lay anterior to the front side. In this manner, the pocket has a longitudinal length extending from the first latitudinal axis to the second latitudinal axis.

The method further includes the chronological step of: providing and positioning a decorative item proximate to the pocket such that the decorative item is visible from the front side without blocking the pocket when the sheet is oriented in the tri-folded position. Of course, a decorative embellishment may be added to the front side and is not limited to just the pocket area.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
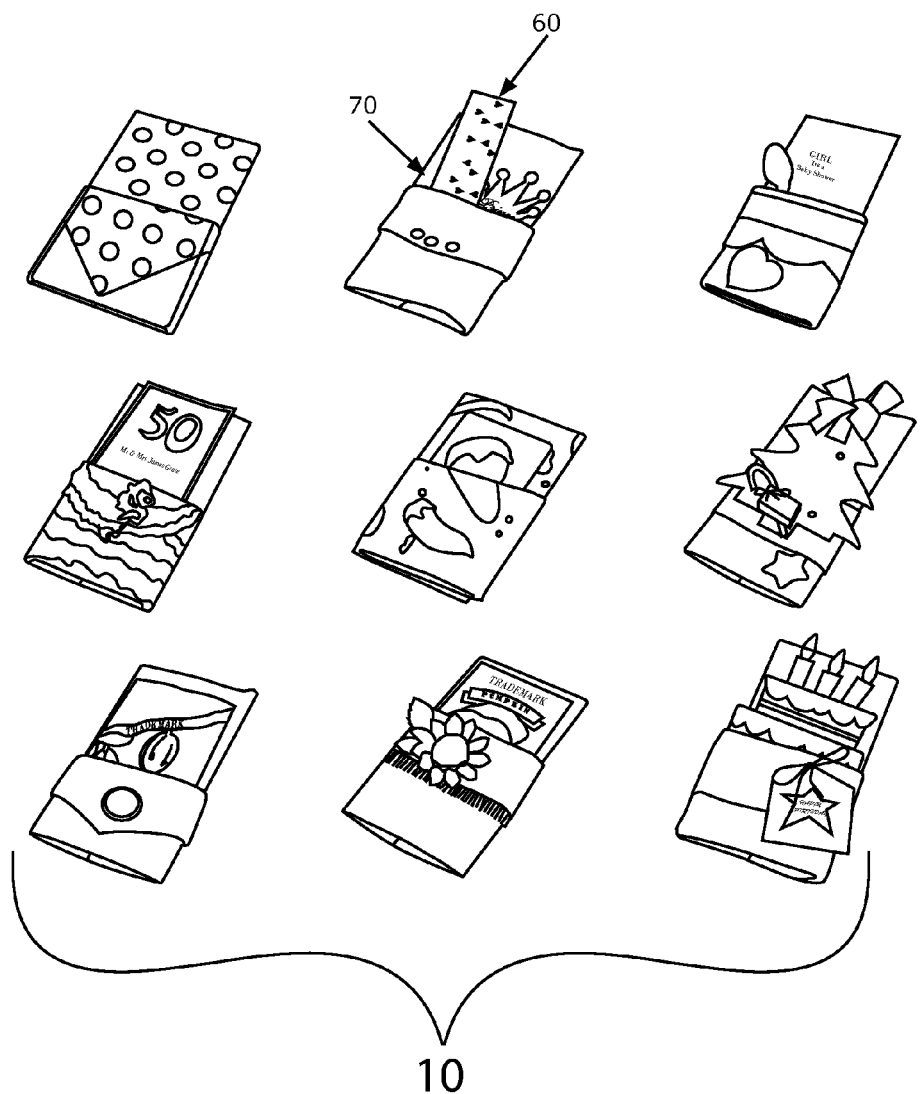
FIG. 1 is a perspective view showing a variety of exemplary keepsakes, in accordance with the non-limiting exemplary embodiment(s)
Figure 2:
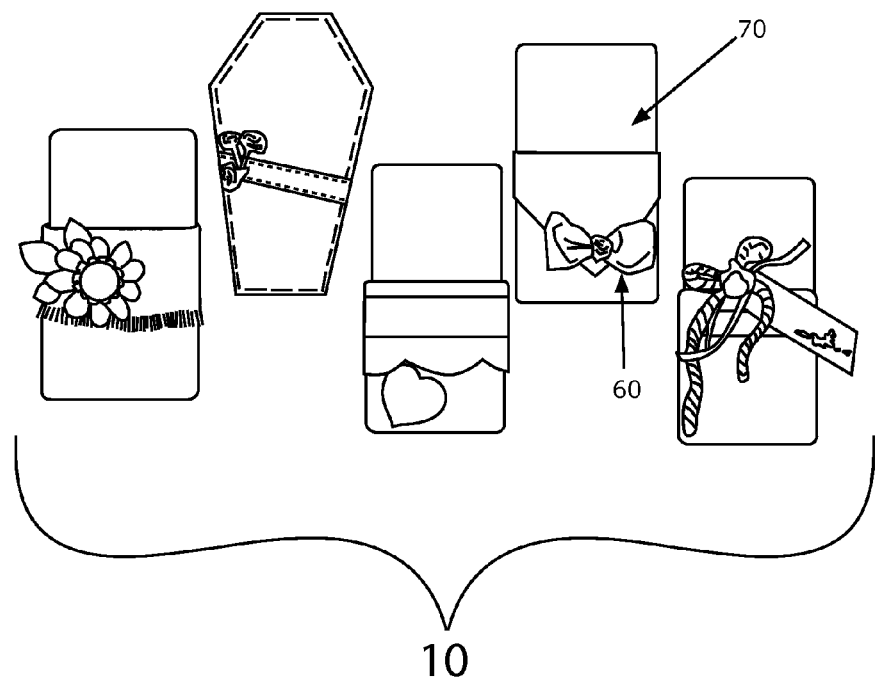
FIG. 2 is a perspective view showing a variety of exemplary keepsakes, in accordance with the non-limiting exemplary embodiment(s)
Figure 3:
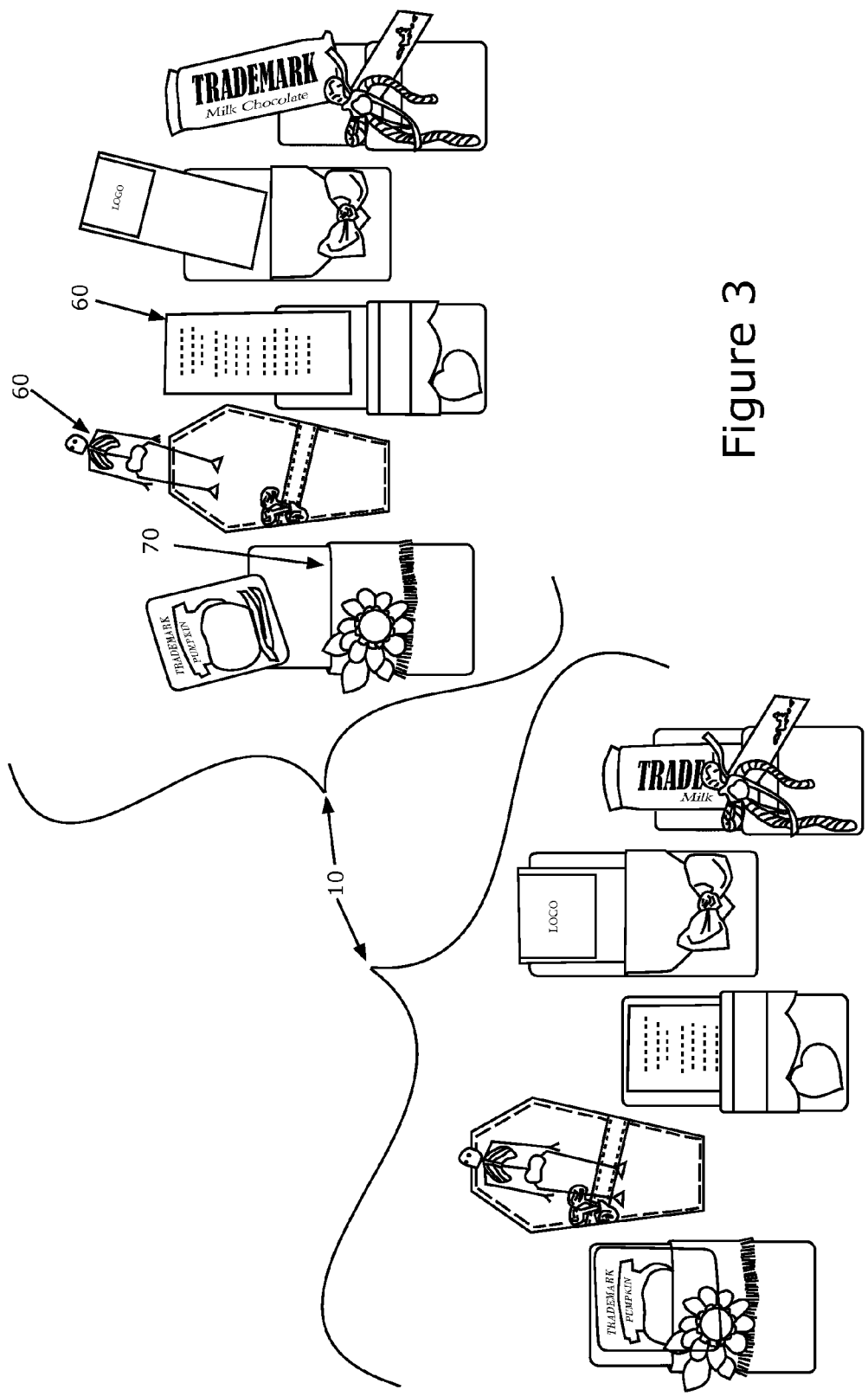
FIG. 3 is a perspective view showing a variety of exemplary keepsakes, in accordance with the non-limiting exemplary embodiment(s)
Figure 4:
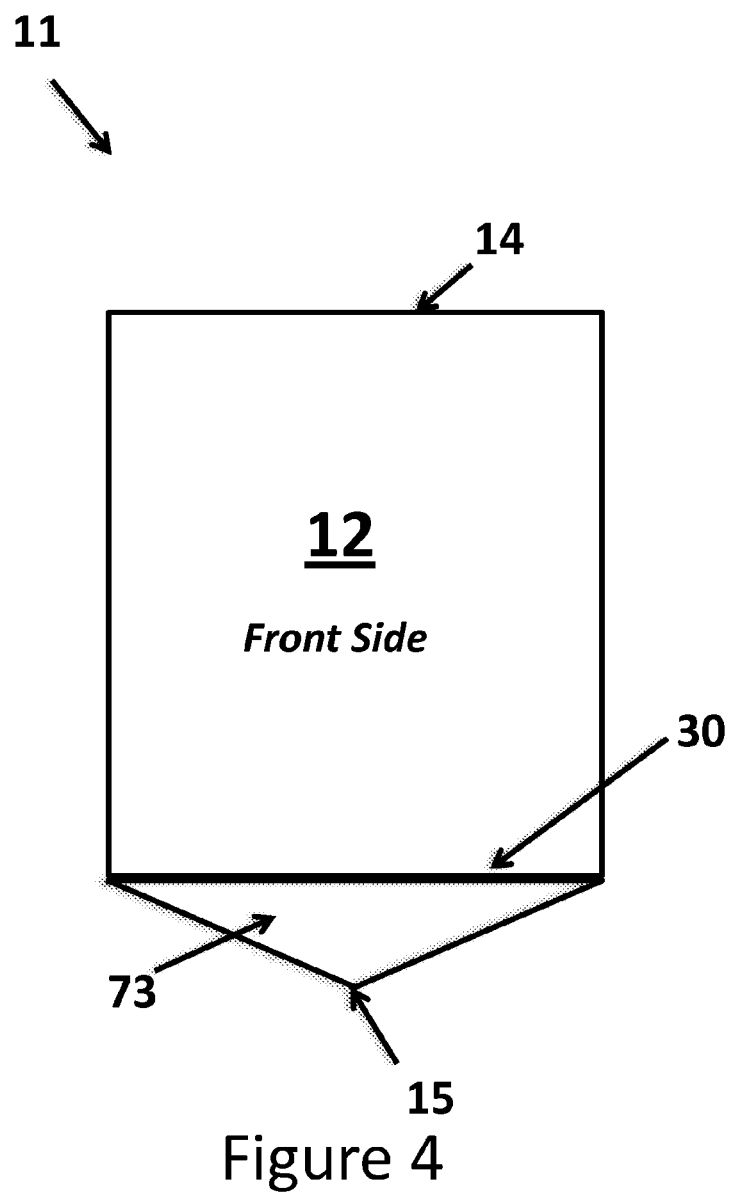
FIG. 4 is a front elevational view showing the flap folded at its corners to provide a triangular shape (other shapes may be employed as well), in accordance with the non-limiting exemplary embodiment(s)
Figure 5:
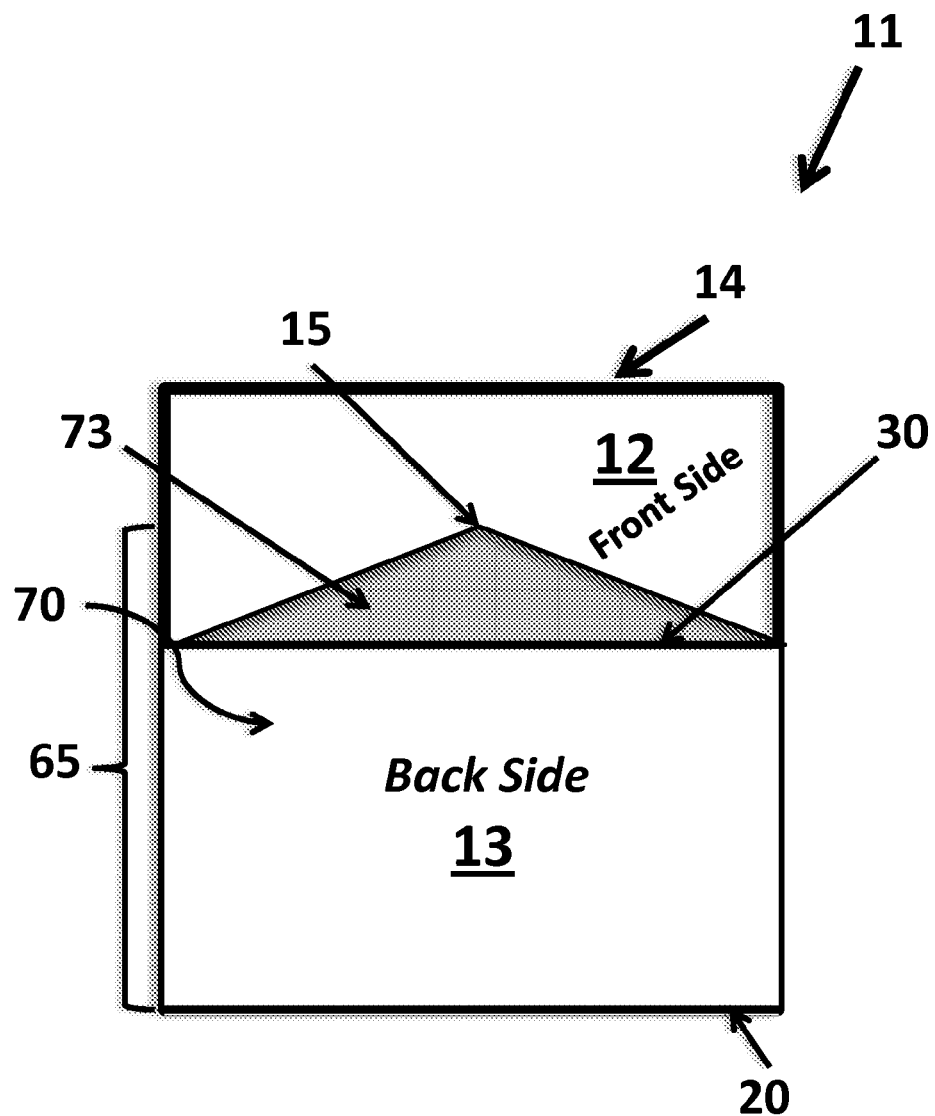
FIG. 5 is a front elevational view showing the bottom portion folded along a first latitudinal axis, in accordance with the non-limiting exemplary embodiment(s)
Figure 6:
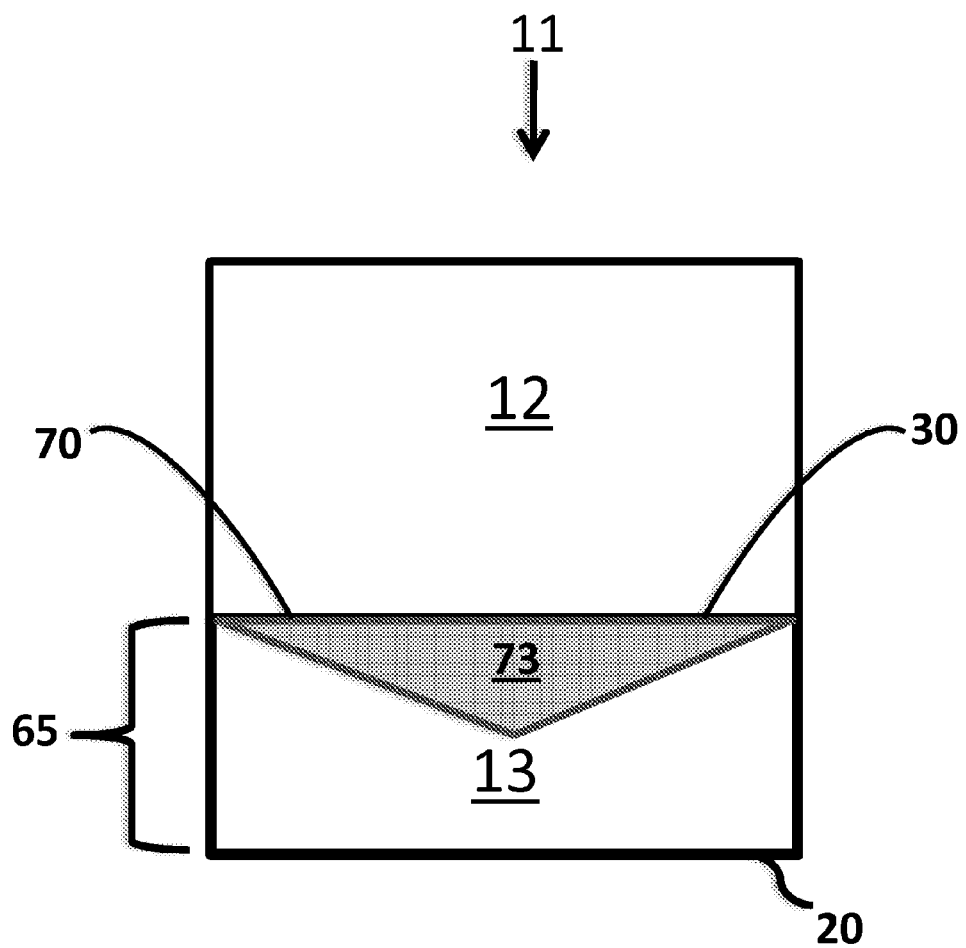
FIG. 6 is a front elevational view showing the flap folded along a second latitudinal axis, in accordance with the non-limiting exemplary embodiment(s)
Figure 7:
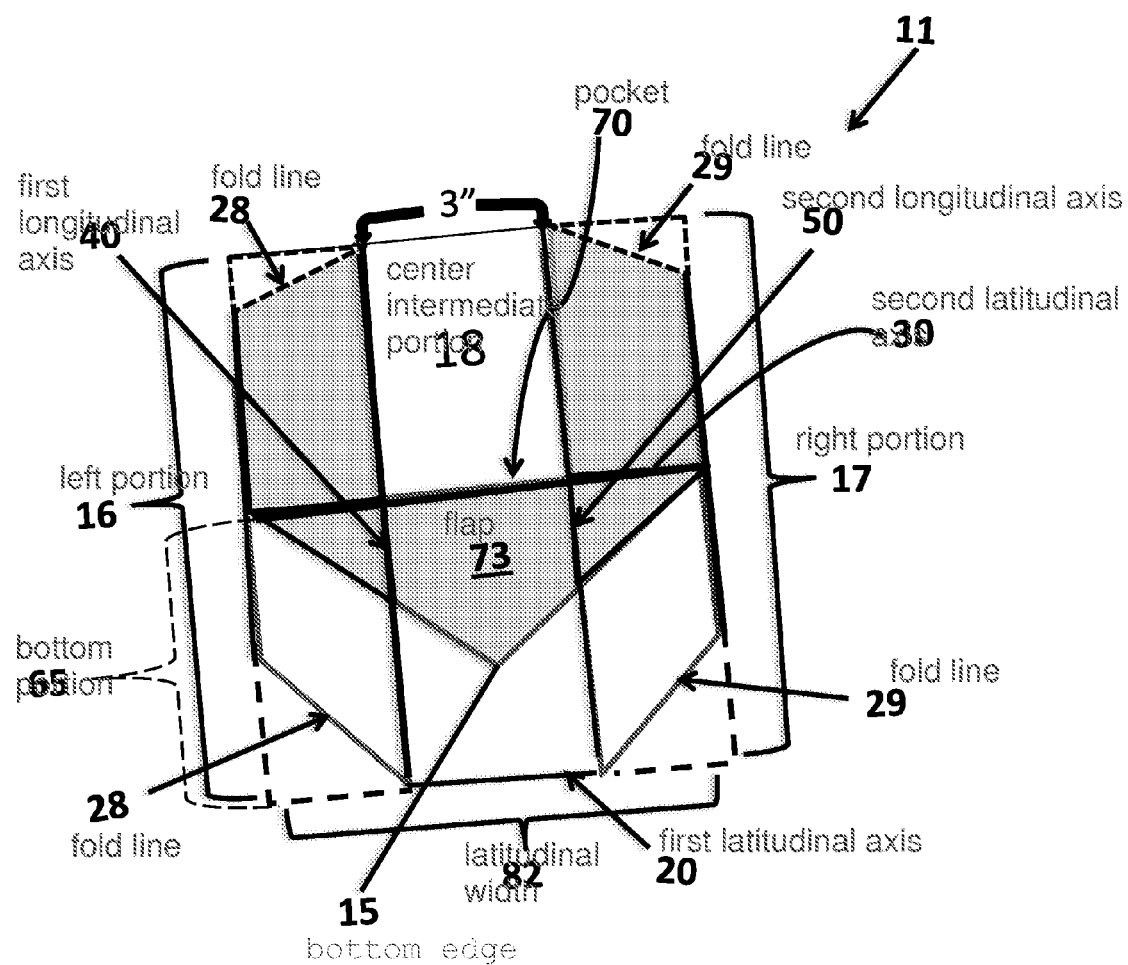
FIG. 7 is a front elevational view showing opposed corners of the sheet folded rearwardly away from the front side, in accordance with the non-limiting exemplary embodiment(s)
Figure 8:
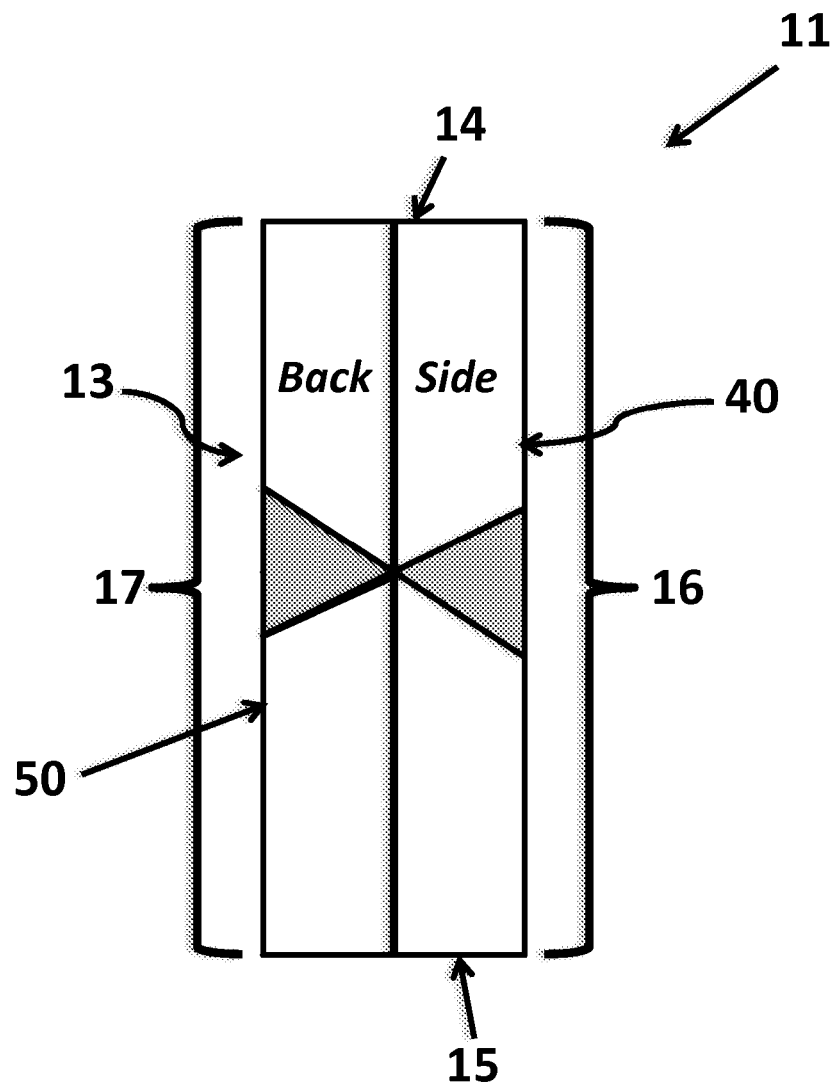
Figure 9:
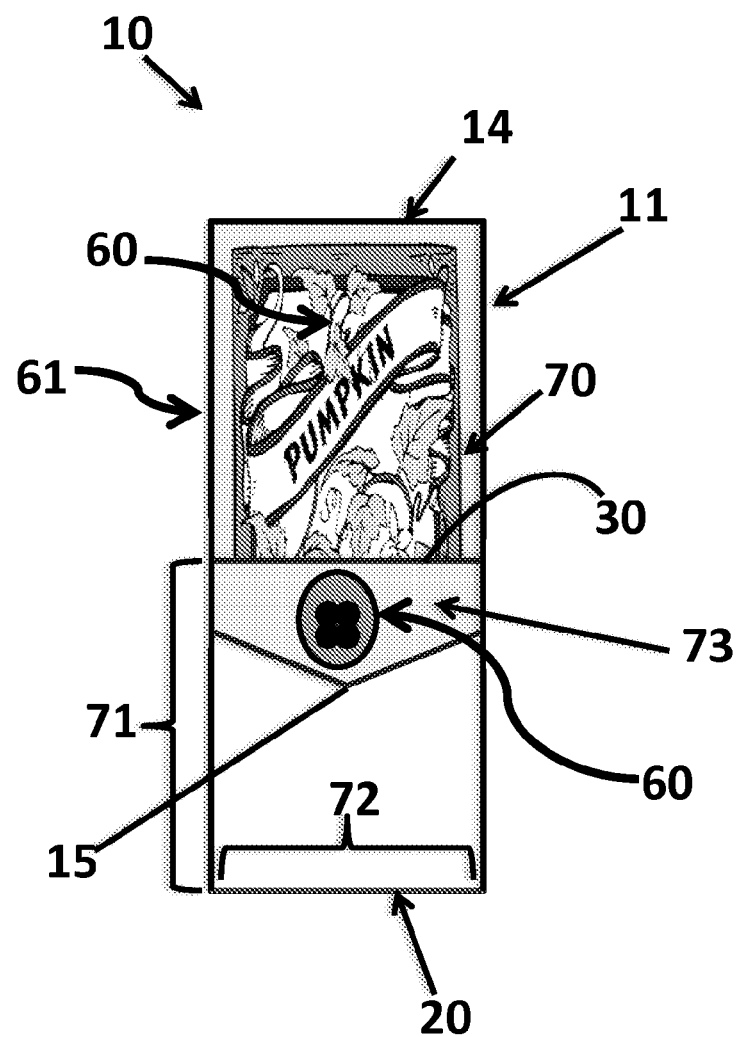

FIG. 8 is rear elevational view showing the left and right portions folded rearwardly along the first and second longitudinal axes and rearwardly away from the front side, in accordance with the non-limiting exemplary embodiment(s); and FIG. 9 is a front elevational view of the keepsake provided with a decorative item disposed at the pocket formed on the front side of the intermediate portion, in accordance with the non-limiting exemplary embodiment(s).

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

A non-limiting exemplary embodiment of the present disclosure is referred to generally in the figures and is intended to provide a decorative keepsake configured to be filled with party favors, treats, small gifts, gift cards and/or greeting cards. It should be understood that the exemplary embodiment may be used to provide many different types of party favors, treats, small gifts, gift cards and/or greeting cards, and should not be limited to any particular celebratory occasion described herein.

Referring to FIGS. 1-9 in general, a keepsake 10 for being filled with party favors, treats, small gifts, gift cards and/or greeting cards is disclosed as including a flexible sheet 11 provided with oppositely disposed front and rear sides 12, 13, oppositely disposed top and bottom edges 14, 15, oppositely disposed left and right portions 16, 17, a center (intermediate) portion 18 intermediately disposed between the left and right portions 16, 17, a bottom portion 65 extending upwardly from the bottom edge 15 and spanning across the right 17, center 18 and left 16 portions, respectively. A decorative item 60 is positioned proximate to the pocket 70 such that the decorative item 60 is visible from the front side 12 without blocking the pocket 70 when the sheet 11 is oriented in the tri-folded position 61.

Advantageously, the sheet 11 is selectively oriented in the tri-folded position 61 when the bottom portion 65 is folded along a first latitudinal axis 20 towards the top edge 14 such that the bottom edge 15 terminates prior to reaching the top edge 14. Such a bottom portion 65 is further folded along a second latitudinal axis 30 towards the first latitudinal axis 20 such that the bottom edge 15 terminates prior to reaching the first latitudinal axis 20. The left and rights portions 16, 17 are folded along first and second longitudinal axes 40, 50, respectively, and away from the front side 12 such that the left and right portions 16, 17 lay anterior to the front side 12 thereby forming pocket 70 at the intermediate section 18 and the front side 12. In this manner, the pocket 70 has a longitudinal length 71 extending from the first latitudinal axis 20 to the second latitudinal axis 30.

In a non-limiting exemplary embodiment, the bottom portion 65 lays over the pocket 70 and thereby creates a flap 73 extending downwardly from the pocket 70 when the sheet 11 is at the tri-folded position 61. The flap 73 may be triangular by folding bottom edge 15 along fold lines 28, 29. Similarly, top edge 14 may be folded along fold lines 28, 29, as perhaps best shown in FIG. 7.

In a non-limiting exemplary embodiment, the left and right portions 16, 17 overlap each other (by interfitting with each other and forming a seam) when the sheet 11 is at the tri-folded position 61, as perhaps best shown in FIG. 8.

In a non-limiting exemplary embodiment, the bottom portion 65 continuously spans across an entire latitudinal width 82 of the left and right portions 16, 17 as well as the intermediate (center) portion 18.

In a non-limiting exemplary embodiment, the pocket 70 spans across an entire latitudinal width 72 of the intermediate (center) portion 18 when the sheet 11 is at the tri-folded position 61.

In a non-limiting exemplary embodiment, the rear side 13 is entirely covered by the overlapping left and right portions 16, 17 when the sheet 11 is at the tri-folded position 61.

In a non-limiting exemplary embodiment, the bottom portion 65 spans across an entire latitudinal width 82 of the sheet 11.

In a non-limiting exemplary embodiment, the present disclosure further includes a method of utilizing a keepsake 10. Such a method includes the initial step of: providing a flexible sheet 11 including oppositely disposed front and rear sides 12, 13, oppositely disposed top and bottom edges 14, 15, oppositely disposed left and right portions 16, 17, a center portion 18 intermediately disposed between the left and right portions 16, 17, and a bottom portion 65 extending upwardly from the bottom edge 15 and spanning across the right 17, center 18 and left 16 portions, respectively.

The method further includes the chronological steps of: orienting the flexible sheet 11 to a tri-folded position 61 by performing the following steps: folding the bottom portion 65 along a first latitudinal axis 20 towards the top edge 14 such that the bottom edge 15 terminates prior to reaching the top edge 14; folding the bottom portion 65 along a second latitudinal axis 30 towards the first latitudinal axis 20 such that the bottom edge 15 terminates prior to reaching the first latitudinal axis 20; forming a pocket 70 at the intermediate section and the front side 12 by folding the left and rights portions 16, 17 along first and second longitudinal axes 40, 50, respectively, and away from the front side 12 such that the left and right portions 16, 17 lay anterior to the front side 12. In this manner, the pocket 70 has a longitudinal length 71 extending from the first latitudinal axis 20 to the second latitudinal axis 30.

The method further includes the chronological step of: providing and positioning a decorative item 60 proximate to the pocket 70 such that the decorative item 60 is visible from the front side 12 without blocking the pocket 70 when the sheet 11 is oriented in the tri-folded position 61.

In a non-limiting exemplary embodiment, the decorative keepsake 10 is illustrated as a unique product offering users thoughtful mementos to share at special events. For example, the decorative keepsake 10 may be a specially designed handcrafted decorative accessory including a folded pocket 70, with the exterior of the pocket 70 adorned with fancy embellishments that celebrate specific occasions and events. Notably, these charming keepsakes 10 could be filled with any number of small party favors, candy, or other sentimental trinkets. The material which forms the decorative keepsake 10 could range from soft cotton, to fancy silk, velvet and even paper and plastic, to name a few options. Further, these favors could be produced in a variety of colors including vibrant shades and pastel hues, as well as neutral shades of black, beige and white.

In a non-limiting exemplary embodiment, the decorative keepsake 10 may be produced from a single fabric sheet 11 measuring approximately 8 inches in length by approximately 12.5 inches in width. As an example, the decorative keepsake 10 may be produced by creating a pocket 70 that may measure approximately 75% of the sheet's 11 total length.

In a non-limiting exemplary embodiment, the flap-like covering 73 may be trimmed into any number of shapes including straight, pointed, rounded, scalloped or squared, for example. The base of the pocket 70 may be modified from its rectangular shape into triangular, oval or trapezoid configurations, for example. A simple loop fastener or comparable mechanism could be attached to the front of the pocket 70 for use in securing the keepsake 10 closed if so desired. To finalize the keepsake 10, the two side portions 16, 17 may be tucked—one inside the other—on the back of the pocket 70 to create a solid, cohesive piece. The decorative keepsake 10 may be permanently stitched together, lending to the overall structural integrity of the unit. The finished decorative keepsake 10 may be adorned with any number of decorative embellishments covering a wide array of design themes. These themes may include but are not limited to: weddings, bridal showers, baby showers, holiday celebrations, birthdays and anniversaries, to name a few. For example, a decorative keepsake 10 to be presented at a baby shower may be produced in a soft pink or pastel blue silk material and adorned with fancy bow or perhaps even a diaper pin.

In a non-limiting exemplary embodiment, the decorative keepsake 10 may be used as a charming party favor filled with mints, chocolate, comparable party favor, gift card and/or greeting card. Similarly, decorative keepsakes 10 to be offered at an afternoon garden party may be constructed of burlap material and adorned with colorful faux flowers. Filled with a packet of seeds, this unique keepsake 10 provides a thoughtful memento to be shared with party guests. Crafted from black felt and cut to resemble a spooky coffin, decorative keepsakes 10 filled with whimsical Halloween toys or candy would prove a favored gift of any trick-or-treater. As can be imagined, design possibilities for this product line, as well as fun and novel ways of sharing these decorative keepsakes are virtually endless.

In a non-limiting exemplary embodiment, the decorative keepsake 10 provides consumers a striking and unique memento to be shared at any party, shower or holiday celebration. A decorative pocket 70 designed to neatly store a party favor, gift card and/or greeting card, the decorative keepsake 10 provides an attractive alternative to traditional party gifts, while also affording a novel conversation piece which would truly recognize and call attention to the event at hand. Produced in an endless variety of design themes, the decorative keepsake 10 proves a thoughtful gift to be shared at a bridal shower, anniversary party, or retirement celebration.

Upon receipt of the decorative keepsake 10, the user may remove the party favor 60, treat, small gift, gift card and/or greeting card and then tuck the decorative keepsake 10 into a scrapbook, hope chest or even display the unit on a bulletin board; offering a lasting memento that would spark sweet memories of a special day. With a myriad of stylish options available, users will enjoy choosing a decorative keepsake 10 to best suit their gift giving needs. Beautifully constructed, this decorative showpiece is well suited for a party use, as well as providing a festive accent at fundraisers, charity events and similar gatherings. Handcrafted of quality materials, the decorative keepsake 10 provides safe and secure storage for party favors stored within.

In a non-limiting exemplary embodiment, the decorative keepsake 10 provides a striking and novel memento to be shared at parties, showers and similar social gatherings. Beautifully handcrafted, this decorative sheet 11 proves a favorite way of presenting a party favors, treats, small gifts, gift cards and/or greeting cards to guests, thus could be an invaluable accessory for any party host or hostess.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A keepsake comprising: a flexible sheet comprising oppositely disposed right and left portions;
   a center portion intermediately disposed between said right and left portions;
   a bottom edge located at said center portion and intermediately positioned between said right and left portions;
   a bottom portion extending upwardly from said bottom edge and spanning across said right, center and left portions, respectively;
   said bottom portion being folded along a first latitudinal axis, said bottom portion further being folded along a second latitudinal axis towards said first latitudinal axis such that said bottom edge terminates prior to reaching said first latitudinal axis, and
   said left and right portions are folded along first and second longitudinal axes, respectively, and away from said front side such that said left and right portions lay anterior to said front side thereby forming a pocket at said intermediate section; and
   a decorative item positioned proximate to said pocket;
   wherein said pocket has a longitudinal length extending from said first latitudinal axis to said second latitudinal axis;
   said first latitudinal axis being parallel to said second latitudinal axis; said first longitudinal axis being parallel to said second longitudinal axis; each of said first longitudinal axis and said second longitudinal axis being orthogonal to each of said first latitudinal axis and said second latitudinal axis;
   said bottom portion being located between said first latitudinal axis and said second latitudinal axis;
   said left portion being coextensively shaped as said right portion;
   said bottom edge being intermediately disposed between said first longitudinal axis and said second longitudinal axis.

2. The keepsake of claim 1, wherein said bottom portion spans across an entire latitudinal width of said sheet.

3. A method of utilizing a keepsake comprising the steps of:
   providing a flexible sheet comprising oppositely disposed front and rear sides, oppositely disposed top and bottom edges, oppositely disposed right and left portions, a center portion intermediately disposed between said right and left portions, and a bottom portion extending upwardly from said bottom edge and spanning across said right, center and left portions, respectively;
   orienting said flexible sheet to a tri-folded position by performing the following steps folding said bottom portion along a first latitudinal axis towards said top edge such that said bottom edge terminates prior to reaching said top edge, folding said bottom portion along a second latitudinal axis towards said first latitudinal axis such that said bottom edge terminates prior to reaching said first latitudinal axis, forming a pocket at said intermediate section and said front side by folding said left and rights portions along first and second longitudinal axes, respectively, and away from said front side such that said left and right portions, lay anterior to said front side; wherein said pocket has a longitudinal length extending from said first latitudinal axis to said second latitudinal axis; and providing and positioning a decorative item proximate to said pocket such that said decorative item is visible from said front side without blocking said pocket when said sheet is oriented in said tri-folded position.

\* \* \* \* \*